Dec. 13, 1960

A. E. FENTIMAN 2,964,147

TRUSS AND COMPONENTS THEREFOR

Filed Feb. 11, 1955

Inventor
ARTHUR E. FENTIMAN
W. Irwin Haskett
Attorney

United States Patent Office 2,964,147
Patented Dec. 13, 1960

2,964,147

TRUSS AND COMPONENTS THEREFOR

Arthur E. Fentiman, 129 Iona St., Ottawa, Ontario, Canada, assignor, by mesne assignments, to Clarence Frank Fentiman, Arthur Edward Fentiman, and Harold Gordon Fentiman, trading as Triodetic Structures, Ottawa, Ontario, Canada Filed Feb. 11, 1955, Ser. No. 487,514

5 Claims. (Cl. 189—34)

The present invention relates to improvements in structural components for skeleton framework assemblies such as trusses, frames and girders, bridges, towers, roofs, decks, walls and the like and may be regarded as a continuation-in-part of my pending United States application, Serial Number 450,717, filed August 18, 1954, now Patent No. 2,931,467.

Tubular elements or pipes are recognized as possessing advantages over other structural forms because of the peculiar load-transmitting qualities inherent in their circular cross section and their favorable strength-weight ratio. The failure to employ them more extensively in trusses and truss-like structures has probably been due chiefly to the lack of suitable connectors or coupling means for easily and efficiently joining their ends. In my copending application mentioned above, coupling members for securing the ends of a plurality of radiating and angularly diverging tubular struts are shown and described, which coupling members can be united in axially aligned multiples in the production of endless arrangements of equilateral skeleton framed octahedron-tetrahedronal forms.

In truss-like structural assemblies, the convergence of the axis of radial and/or diagonal struts and ties is regarded as most important in the transmission of loads, hence special attention must be given the design of a connector, especially one required to carry both radial and diagonal members.

It is an object of the present invention to provide a truss of generally improved form employing simple, reliable and efficient load-transmitting connections for radial and diagonal ties or braces.

It is a further object of the invention to provide a truss connector to both the periphery and end of which struts or like members may be secured.

It is a further object of the invention to provide an improved truss connection, of the easily assembled, knock-down type, wherein the connector and strut ends are so formed that the axis of radial and diagonal struts converge centrally in the connector.

A further object of the invention is the provision of a connection for radial and diagonal braces that employ a hub-like connector to which both radial and diagonal braces are secured by the one fastener.

To the accomplishment of these and related objects as shall become apparent as the description proceeds, the invention resides in the construction, combination and arrangement of parts as shall be hereinafter more fully described, illustrated in the accompanying drawing, and pointed out in the claims hereunto appended.

The invention will be best understood and can be more clearly described when reference is had to the drawing forming a part of this disclosure wherein like characters indicate like parts throughout the several views.

In this specification the term truss is used in a broad general sense and includes framework, and skeleton framework assemblies of all kinds; here too, such terms as arms, braces, ties, rods, tubes, struts and divergent members may be used in a general sense.

Figure 1:
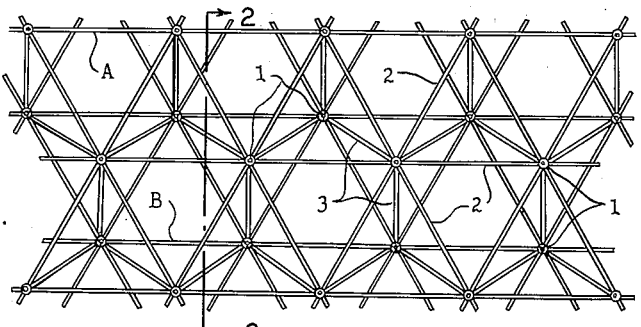
Figure 1 is a plan view of a truss of equilateral triangle design, in which the connectors receive up to six radials.
Figure 2:
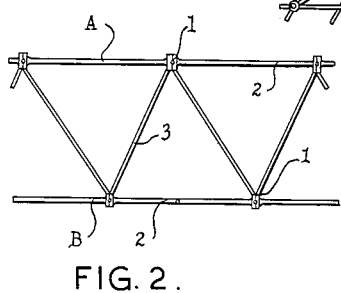
Figure 2 is a vertical transverse section thereof, as taken on line 2—2, showing the same connectors receiving also three diagonal braces.

The truss shown in Figures 1 and 2 will be seen to consist of three main elements, namely hub-like connectors 1, arms 2, radiating horizontally therefrom and forming the upper and lower equilateral triangle lattice frames A and B, and other diagonal arms or braces 3 extending angularly between the connectors of upper and lower frames and serving to unite said frames in vertically spaced relation. This truss is of the so-called easily assembled, bolted or knockdown variety, suitable for assembly on the site; that is the radial arms 2 and the diagonal arms or braces 3 are readily connectible to or separable from the connectors 1, using only such tools as a common mallet and wrench, all the arms attaching to any connector being secured thereto by a single fastener such as a nut and bolt with or without one or more washers. There is practically no limit to the size of such a truss as the lattice frames may be made as long and as wide as desired and while only two such lattice frames are shown connected in vertically spaced relation, any wanted thickness of truss may be built up by using connectors designed to receive diagonal arms or braces 3 at both ends instead of only one end and so successive frames in endless depth may be added on.

The connectors 1, described as having the general form of a hub, have a central or axial bore 4 and may be substantially cylindrical though the circumference is not necessarily a true circle. Notches 5 occur in the periphery 6 preferably running the length of said hub and are open to at least one end thereof and are provided with longitudinally extending keyways 7. One end 8 of the hub is dished having a concavity 9 therein that is concentric with the bore 4, its base 9a being flat and at right angles to the axis of the hub and being surrounded by a peripheral flange 9b inclined outwardly at a redetermined angle. As intimated, where more than two vertically spaced lattice frames are to be united in a truss of considerable thickness, the connectors of intermediate frames would be dished, as described, at both ends.

Radial arms 2 employed herein as horizontal radials are formed of hollow tubing with opposite ends 10 flattened equally from both sides and provided with transverse keys or key-like formations 11 on such flattened ends for longitudinal insertion and tight fitting anchorage in the hub keyway notches 5. The length of a hub 1, from the base 9a of its dished end 8 to its opposite end, corresponds to the width of the flattened keyed end 10 of a radial arm 2. These arms are shown and described as horizontal radials but they do not necessarily extend as true radials as either the notches or keyed arm ends may be angularly disposed to deflect the arms from radial position and, further, by forming the arm ends and their keys at an angle to the transverse, such arms may be caused to extend from the hub in a non-horizontal plane or at an angle of other than 90 degrees to the axis of the hub.

While a truss may be constructed with horizontal radial arms and connectors as described and having other diagonal arms or braces with their keyed ends at an angle to the transverse also engaged with similar connectors having peripheral keyway slots and such connectors carrying horizontal radial arms and diagonal braces respectively joined in axial alignment, their compression and/or tension loads are not as well transmitted as would be the case if the axis of horizontal radial arms and diagonal braces were arranged to converge. To strengthen and simplify such a connection, a unitary type of hub 1, as herein described, is now used, having, in addition to the peripheral notches 5 for the horizontal radial arms 2, and end 8 thereof recessed to receive the ends or feet of diagonal braces 3; the coupling assembly being so formed and proportioned that the axis of all attached arms converge substantially at a point in the centre of the hub connector.

The diagonal braces 3, here used with the improved connectors, like the arms 2, preferably formed of light weight tubes of the desired length with their ends 14 fashioned as feet to laterally engage the dished ends 8 of the connectors 1. These tube ends 14 may be compressed to one side in a concavo-convex form as at 15 and terminally formed, flattened, bent inwards at an angle to the axis of the tube, of say 27½ degrees, and finished as a flat foot 16 in the shape of a sector of 120 degrees with an arcuate notch 17 of a third of a circle at its apex. The feet 16 of three such braces will nest in and completely fill the dished end 8 of a connector; their heel formation, where the compressed concavo-convex part joins the flattened end just above the foot that extends angularly inwards, having a taper corresponding to the outward incline of peripheral flange 9b of the connector to assure a snug fit and their three arcuate notches 17 combining to provide a perforation of the same size as and aligned with the connector bore 4.

Figure 3:
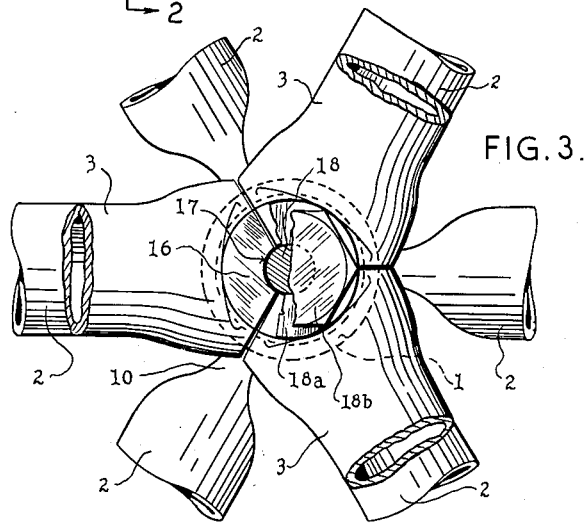
Figure 3 is an enlarged detail plan of the connector to which six radial and three diagonal braces are secured, parts of the fastening device being broken away.
Figure 6:
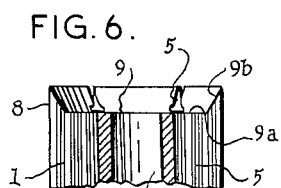
Figure 6 is a vertical section of the dished upper end of the connector, as taken on line 6—6 of Figure 5.
Figure 5:
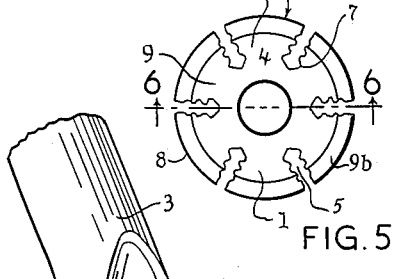
Figure 5 is a plan of the connector.
Figure 7:
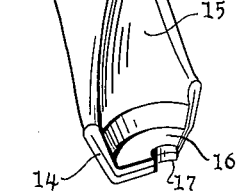
Figure 7 is a perspective view of the angular, sector-shaped foot of one of the diagonal braces.
Figure 4:
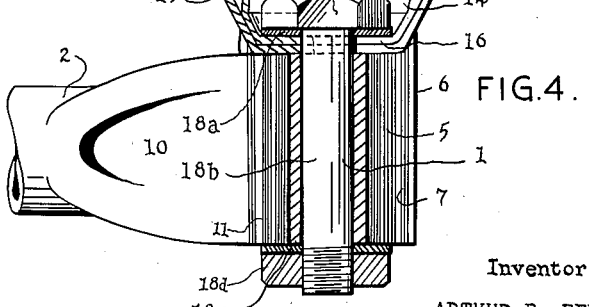
Fig. 4 is a vertical center section along the longitudinal axes of two aligned radial braces.

After the flattened key ends 10 of the radial arms 2 have been inserted in the keyway slots 5 of a connector hub, and the angularly disposed, sector shaped feet 16 of the diagonal braces have been applied laterally to the dished end of the hub and nested in the flanged concavity therein, and blocking the open ends of the keyways slots 5, a suitable fastening means 18 including a nut having lock means therefor including a bolt and washer assembly is employed to secure both the radial arms and diagonal braces to the hub-like connectors; a washer 18a being superposed on the feet of the diagonal braces 3, a bolt 18b passed through the aligned washer, the perforation formed of the apex notches 17 of the feet and the bore 4 of the hub, then another washer 18c applied to the projecting lower end of the bolt and a nut 18d threaded thereon and tightened, centering the keyed ends of the radial arms longitudinally of the hub, and tightly drawing the feet 16 of the braces into the dished hub end seat. On reference to Figures 2 and 3, it will be apparent that the arms 2 extend in fixed radial lines from the connector hub but the diagonal braces 3 may be adjusted rotatably relative to the hub, prior to the tightening of the nut and bolt fastener. Additionally, it is to be noted that the diagonal braces 2 are Z-shaped; that is the opposite ends of a brace are pressed to the same shape and bent at the same angle but extend from the body of the member in diametrically opposite directions for attachment to the confronting or inner ends of the hub-like connectors 1 of the spaced upper and lower lattice frames A and B.

While a truss, and components therefor of new and improved design are set forth herein, it will be apparent that many changes could be made in the foregoing description and widely different embodiments of the invention may be constructed within the scope of the appended claims, without departure from the spirit and scope thereof, and it is intended that all matters contained in this specification and drawings attached hereto shall be interpreted as illustrative and not in a limitative or restrictive sense.

Having thus described the invention, what I claim as new is:

1. For a truss-like structural assembly consisting of divergent members and connectors therefor, a connector for a plurality of divergent members situated at the locus of intersection of the terminal portions of said plurality of divergent members, said connector comprising a body portion having a plurality of peripheral pockets, each of which receives a divergent member, an end pocket for receiving a plurality of divergent members therewithin, said end pocket being in juxtaposition with respect to said peripheral pockets so that said plurality of divergent members received therewithin overlie one end of said peripheral pockets, and fastening means for securing said divergent members within said end pocket and cooperatively interacting with said divergent members within said end pocket for maintaining said divergent members within said peripheral pockets.

2. In a truss the combination of a plurality of struts and a plurality of connectors at the loci of intersection of said struts; each of said connectors comprising a hub portion having an axial bore extending therethrough, a concavity in an end of said hub portion concentric with said bore, and keyway sockets open to the periphery of said hub portion and accessible from either end of said hub portion; various of said struts having angularly disposed terminal portions of substantially sector shape engaging and being co-extensive with the face and side of said concavity, a plurality of such struts interfitting within the concavity of each connector; various other of said struts having flattened ends of a configuration interfitting within said keyway sockets and insertable in said sockets from either end of said connectors; said plurality of struts interfitting within the concavity of each connector and overlying one end of said keyway sockets; and fastening means extending through the bore of each of said connectors for securing said plurality of said last mentioned struts in an interfitting relationship within the concavity of each of said connectors, said fastening means including lock means engaging the opposite end of each of said connectors from the concavity thereof and overlying the end of said keyway sockets at such opposite end of each of said connectors, said plurality of struts interfitting within the concavity of each connector and said fastening means cooperatively interacting and maintaining said flattened ends of said second mentioned struts within said keyway sockets.

3. In a truss-like assembly, a plurality of divergent members, connectors for joining certain of said members together to form a unitary structure, said connectors each comprising a body portion having a plurality of peripheral keyways for receiving the ends of certain of said members and having an inclined peripheral flange at one end thereof forming a dish-like receptacle for receiving and joining the ends of other of said members in an interfitting relationship co-extensive with the face of said dish-like receptacle, said dish-like receptacle being in juxtaposition with respect to said peripheral keyways so that said plurality of divergent members received therewithin overlie one end of said peripheral keyway, and fastening means for securing said divergent members within said dish-like receptacle and cooperatively interacting with said divergent members within said dish-like receptacle for maintaining said divergent members within said peripheral keyways.

4. In a truss-like assembly, a plurality of divergent members, connectors joining certain of said members together to form a unitary structure, said connectors each comprising a body portion having a plurality of peripheral keyways receiving the ends of certain of said members and having an inclined peripheral flange at one end thereof forming a dish-like receptacle receiving and joining the ends of the other of said members in an interfitting relationship coextensive with the face of said dish-like receptacle, said dish-like receptacle being in juxtaposition with respect to said peripheral keyways so that said plurality of divergent members received therewithin overlie one end of said peripheral keyways, and fastening means securing said divergent members within said dish-like receptacle, said fastening means cooperatively interacting with said divergent members within said dish-like receptacle in maintaining said divergent members within said peripheral keyways.

5. In a truss assembly, a plurality of divergent members, connectors joining certain of said members together to form a unitary structure, said connectors each comprising a body portion having a plurality of peripheral keyways receiving the ends of certain of said members and having an inclined peripheral flange at each end thereof forming dish-like receptacles at each end of said body portion, said dish-like receptacles at each end of said body portion receiving and joining the ends of other of said members in an interfitting relationship coextensive with the face of their respective dish-like receptacles in which they are received, said dish-like receptacle being in juxtaposition with respect to said peripheral keyways so that said plurality of divergent members received therewithin lie adjacent one end of said peripheral keyways, and fastening means securing said divergent members within said dish-like receptacle, said fastening means engaging said divergent members within said dish-like receptacle and maintaining said divergent members within said peripheral keyways.

References Cited in the file of this patent

UNITED STATES PATENTS

| | | |
|---|---|---|
| 1,264,582 | Vergara | Apr. 30, 1918 |
| 1,806,010 | Williams | May 19, 1931 |
| 1,914,344 | Ragsdale | June 13, 1933 |
| 1,946,408 | Loudy | Feb. 6, 1934 |
| 1,949,818 | Tarbox | Mar. 6, 1934 |
| 2,576,400 | Howie | Nov. 27, 1951 |

FOREIGN PATENTS

| | | |
|---|---|---|
| 24,087 | Great Britain | 1914 |
| 673,610 | Great Britain | June 11, 1952 |
| 682,854 | France | Feb. 18, 1930 |